(12) United States Patent
Ariaratnam et al.

(10) Patent No.: US 9,951,606 B2
(45) Date of Patent: Apr. 24, 2018

(54) DIRECTIONAL DRILLING USING MECHANICAL WAVES DETECTORS

(71) Applicants: Samuel Ariaratnam, Scottsdale, AZ (US); Jason Lueke, Sherwood Park (CA); Hong Ting Derek Choi, Hong Kong (HK); Shu Jun Shan, Changsha (CN)

(72) Inventors: Samuel Ariaratnam, Scottsdale, AZ (US); Jason Lueke, Sherwood Park (CA); Hong Ting Derek Choi, Hong Kong (HK); Shu Jun Shan, Changsha (CN)

(73) Assignee: Alcorp Ltd., Central Hong Kong (CN)

( * ) Notice: Subject to any disclaimer, the term of this patent is extended or adjusted under 35 U.S.C. 154(b) by 0 days.

(21) Appl. No.: 14/353,993

(22) PCT Filed: Jan. 3, 2014

(86) PCT No.: PCT/CA2014/050003
§ 371 (c)(1),
(2) Date: Apr. 24, 2014

(87) PCT Pub. No.: WO2015/100484
PCT Pub. Date: Jul. 9, 2015

(65) Prior Publication Data
US 2016/0298443 A1    Oct. 13, 2016

(51) Int. Cl.
*E21B 47/024* (2006.01)
*G01V 1/42* (2006.01)
(Continued)

(52) U.S. Cl.
CPC .............. *E21B 47/024* (2013.01); *E21B 7/04* (2013.01); *E21B 7/046* (2013.01); *E21B 10/00* (2013.01);
(Continued)

(58) Field of Classification Search
CPC ................................ E21B 47/024; G01V 1/42
See application file for complete search history.

(56) References Cited

U.S. PATENT DOCUMENTS 3,878,903 A    4/1975  Cherrington
5,904,210 A    5/1999  Stump et al.
(Continued)

FOREIGN PATENT DOCUMENTS

WO    9725519 A1    7/1997
WO    2009146548 A1    12/2009

OTHER PUBLICATIONS

Ning Ai Min, et al. Acoustic Transceiver Optimization Analysis for Downhole Sensor Data Telemetry via Drillstring, Applied Mechanics and Materials, 2013, 302, 389.
(Continued)

*Primary Examiner* — Giovanna C. Wright
(74) *Attorney, Agent, or Firm* — Davis & Bujold PLLC; Michael J. Bujold

(57) ABSTRACT

A method and apparatus for directional drilling using mechanical wave detectors and a drill string having a drill bit at a drill bit end of the drill string. During an underground drilling operation in an underground formation, a mechanical wave signal is transmitted using a mechanical wave transmitter carried at the drill bit end of the drill string. The mechanical wave signal is received by an array of mechanical wave receivers at a ground surface above the underground formation. The received mechanical wave signals are processed to determine at least the location of the drill bit in the underground formation. The position and direction of travel data is communicated to a drilling control unit.

28 Claims, 4 Drawing Sheets

(51) Int. Cl.
  *E21B 47/14* (2006.01)
  *E21B 7/04* (2006.01)
  *E21B 10/00* (2006.01)
  *E21B 44/02* (2006.01)
  *G01V 1/30* (2006.01)
  *E21B 47/06* (2012.01)
  *E21B 47/09* (2012.01)

(52) U.S. Cl.
  CPC .............. *E21B 44/02* (2013.01); *E21B 47/14* (2013.01); *G01V 1/30* (2013.01); *G01V 1/306* (2013.01); *G01V 1/42* (2013.01); *E21B 47/06* (2013.01); *E21B 47/065* (2013.01); *E21B 47/091* (2013.01)

(56) References Cited

U.S. PATENT DOCUMENTS

| | | | |
|---|---|---|---|
| 6,026,913 | A | 2/2000 | Mandal et al. |
| 6,088,294 | A | 7/2000 | Leggett, III et al. |
| 6,320,820 | B1 | 11/2001 | Gardner et al. |
| 6,382,332 | B1 | 5/2002 | Eaton |
| 6,389,360 | B1 | 5/2002 | Alft et al. |
| 6,435,286 | B1 | 8/2002 | Stump et al. |
| 6,833,795 | B1 | 12/2004 | Johnson et al. |
| 7,013,991 | B2 | 3/2006 | Wilson-Langman et al. |
| 7,182,151 | B2 * | 2/2007 | Stump ............... E21B 7/046 166/254.1 |
| 7,251,567 | B2 | 7/2007 | Nickel et al. |
| 7,373,993 | B2 | 5/2008 | Self et al. |
| 7,404,456 | B2 | 7/2008 | Weaver et al. |
| 7,472,761 | B2 | 1/2009 | Burrows et al. |
| 7,590,029 | B2 | 9/2009 | Tingley |
| 7,624,816 | B2 | 12/2009 | Cole et al. |
| 7,647,987 | B2 | 1/2010 | Cole |
| 7,737,863 | B2 | 6/2010 | Jin et al. |
| 8,215,384 | B2 | 7/2012 | Trinh et al. |
| 8,240,399 | B2 | 8/2012 | Kulkarni et al. |
| 8,245,793 | B2 | 8/2012 | Trinh et al. |
| 8,280,634 | B2 | 10/2012 | Young et al. |
| 8,295,125 | B2 | 10/2012 | Chiappetta et al. |
| 2001/0022239 | A1 | 9/2001 | Brune et al. |
| 2005/0173153 | A1 | 8/2005 | Alft et al. |
| 2010/0305864 | A1 | 12/2010 | Gies |
| 2011/0060527 | A1 | 3/2011 | Teodorescu |
| 2013/0118808 | A1 | 5/2013 | Yang |

OTHER PUBLICATIONS

International Search Report issued in corresponding International Patent Application No. PCT/CA2014/050003 dated Jul. 24, 2014.

* cited by examiner

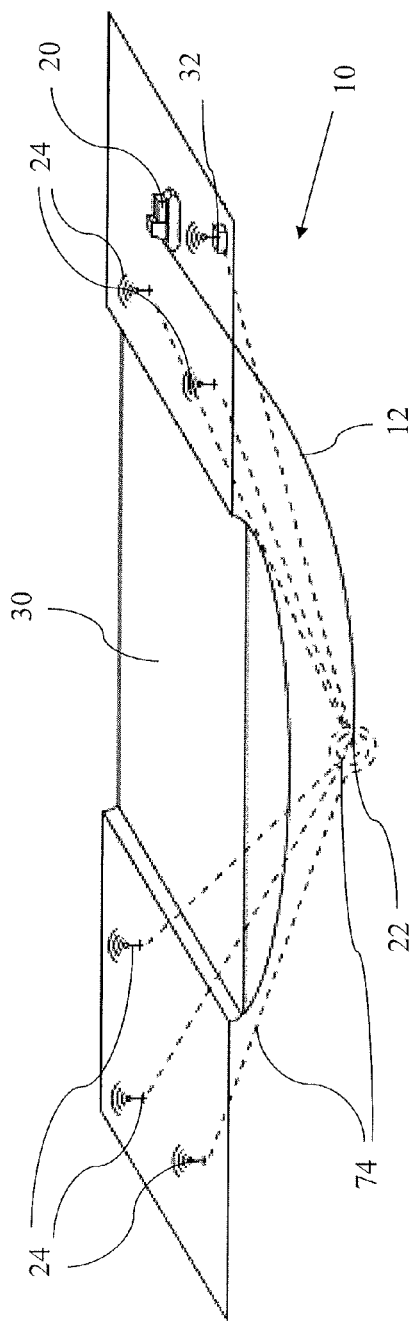
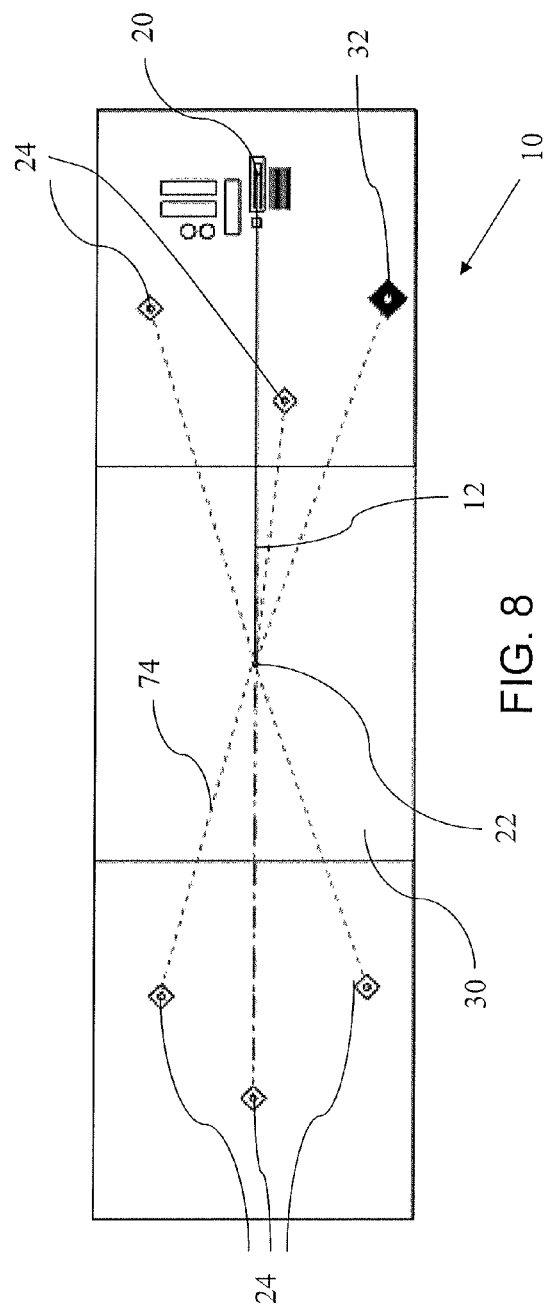

US 9,951,606 B2

DIRECTIONAL DRILLING USING MECHANICAL WAVES DETECTORS

TECHNICAL FIELD

This relates to a method and apparatus for directional drilling that uses mechanical wave transmitters and detectors.

BACKGROUND

Directional drilling is used to make wells or bore hole with non-vertical section and may be used for drilling wells or for directional boring, such as may be used to install utilities. In order to properly form the hole being drilled, measurement-while-drilling (MWD) systems are commonly used. An example of a MWD system is described in U.S. Pat. No. 6,088,294 (Leggett, III et al.) entitled "Drilling system with an acoustic measurement-while-driving system for determining parameters of interest and controlling the drilling direction" uses acoustic transmitters and receivers carried by the drill string to characterize the formation in which it is drilling. United States pregrant publication no. 2013/0118808 (Yang) entitled "Methods for geosteering a drill bit in real time using surface acoustic signals" analyses acoustic signature data to characterize the formation.

Communications with downhole equipment often presents difficulties. As the drill string is lengthened, any hardwired connections must also be extended, with additional time and effort. Alternatively, the signal may be sent wirelessly, however this has its own difficulties, as electromagnetic signals do not propagate well through ground.

SUMMARY

There is provided a method of directional drilling using mechanical wave detectors, comprising the steps of providing a drill string having a drill bit at a drill bit end of the drill string; during an underground drilling operation in an underground formation, transmitting a mechanical wave signal using a mechanical wave transmitter carried at the drill bit end of the drill string; receiving the mechanical wave signal by an array of mechanical wave receivers at a ground surface above the underground formation; processing the received mechanical wave signals to determine at least the location of the drill bit in the underground formation; and communicating the position and direction of travel data to a drilling control unit.

According to an aspect, transmitting the mechanical wave signal may further comprise modulating the mechanical wave signal and receiving the mechanical wave signal may comprise demodulating the mechanical wave signal. The drill string may further comprise downhole condition sensors connected to the mechanical wave transmitter, the mechanical wave transmitter modulating the mechanical wave signal to transmit readings from the downhole condition sensors. The downhole condition sensors may comprise at least one of formation conditions, drill bit temperature, drill bit inclination and drill bit axial orientation.

According to an aspect, the mechanical wave transmitter may comprise a drill bit mechanical wave transceiver and at least one mechanical wave receiver comprises a surface mechanical wave transceiver, and further comprising the step of transmitting a control signal from the surface transceivers to the drill bit mechanical wave transceiver. The control signal may comprise instructions and the drill bit mechanical wave transceiver may be programmed to transmit a response to the instructions.

According to an aspect, the array of mechanical wave receivers may be positioned remotely from the drill string and the drilling control unit.

According to an aspect, each mechanical wave receiver may comprise a processor for processing the received mechanical wave signals.

According to an aspect, the drilling control unit may receive underground information solely from the array of mechanical wave receivers.

According to an aspect, the received mechanical wave signals may be processed to determine the direction of travel of the drill bit.

According to an aspect, the received mechanical wave signals may include information regarding at least one of the inclination of the drill bit, the rotational orientation of the drill bit, the temperature of the drill bit and the formation pressure.

According to an aspect, the received mechanical wave signals may be processed to detect underground obstacles.

According to an aspect, the received mechanical wave signals may be processed to characterize the underground formation.

According to an aspect, the drilling control unit may control the drill string.

According to an aspect, the transmitter and receiver may be tuned to a predetermined frequency.

According to an aspect, the transmitter may transmit the mechanical wave signals at a predetermined amplitude.

According to a further aspect, there is provided an apparatus for directional drilling system. The system has a drill string comprising a control end and a drill bit at a drill bit end, the drill string further comprising a mechanical wave transmitter adjacent to the drill bit end of the drill string. An array of mechanical wave receivers are spaced in an array at a ground surface. The mechanical wave receivers receive a mechanical wave signal transmitted by the mechanical wave transmitter. A processor is programmed to calculate at least the position of the drill bit based on the mechanical wave signal received by the plurality of mechanical wave receivers. There is a drilling control unit at the control end of the drill string and connected to the processor. The drilling control unit controls the operation of the drill string in response to signals received from the processor.

According to an aspect, the mechanical wave transmitter signal may comprise a mechanical wave modulator for modulating the mechanical wave signal and the mechanical wave receiver may comprise a mechanical wave demodulator for demodulating the mechanical wave signal. The drill string further comprises downhole condition sensors connected to the mechanical wave transmitter, the mechanical wave transmitter modulating the mechanical wave signal to transmit readings from the downhole condition sensors.

According to an aspect, the mechanical wave transmitter may comprise a drill bit mechanical wave transceiver and at least one mechanical wave receiver comprises a surface mechanical wave transceiver.

According to an aspect, the control signal may comprise instructions and the drill bit mechanical wave transceiver is programmed to transmit a response to the instructions.

According to an aspect, the one or more mechanical wave receivers may be positioned remotely from the drill string and the drilling control unit.

According to an aspect, each mechanical wave receiver may comprise a processor for processing the received mechanical wave signals.

According to an aspect, the drilling control unit may receive underground information solely from the array of mechanical wave receivers.

According to an aspect, the received mechanical wave signals may be processed to determine the direction of travel of the drill bit.

According to an aspect, the received mechanical wave signals may be processed to detect underground obstacles.

According to an aspect, the received mechanical wave signals may include information regarding at least one of the inclination of the drill bit, the rotational orientation of the drill bit, the temperature of the drill bit and the formation pressure.

According to an aspect, the received mechanical wave signals may be processed to characterize the underground formation.

According to an aspect, the transmitter and receiver may be tuned to a predetermined frequency.

According to an aspect, the transmitter may transmit the mechanical wave signals at a predetermined amplitude.

The aspects described above may be combined in any reasonable combination with other aspects, except to the extent that the aspects are mutually exclusive.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 7 is a perspective view of a directional drilling system.

FIG. 8 is a top plan view of a directional drilling system.

DETAILED DESCRIPTION

Figure 1:
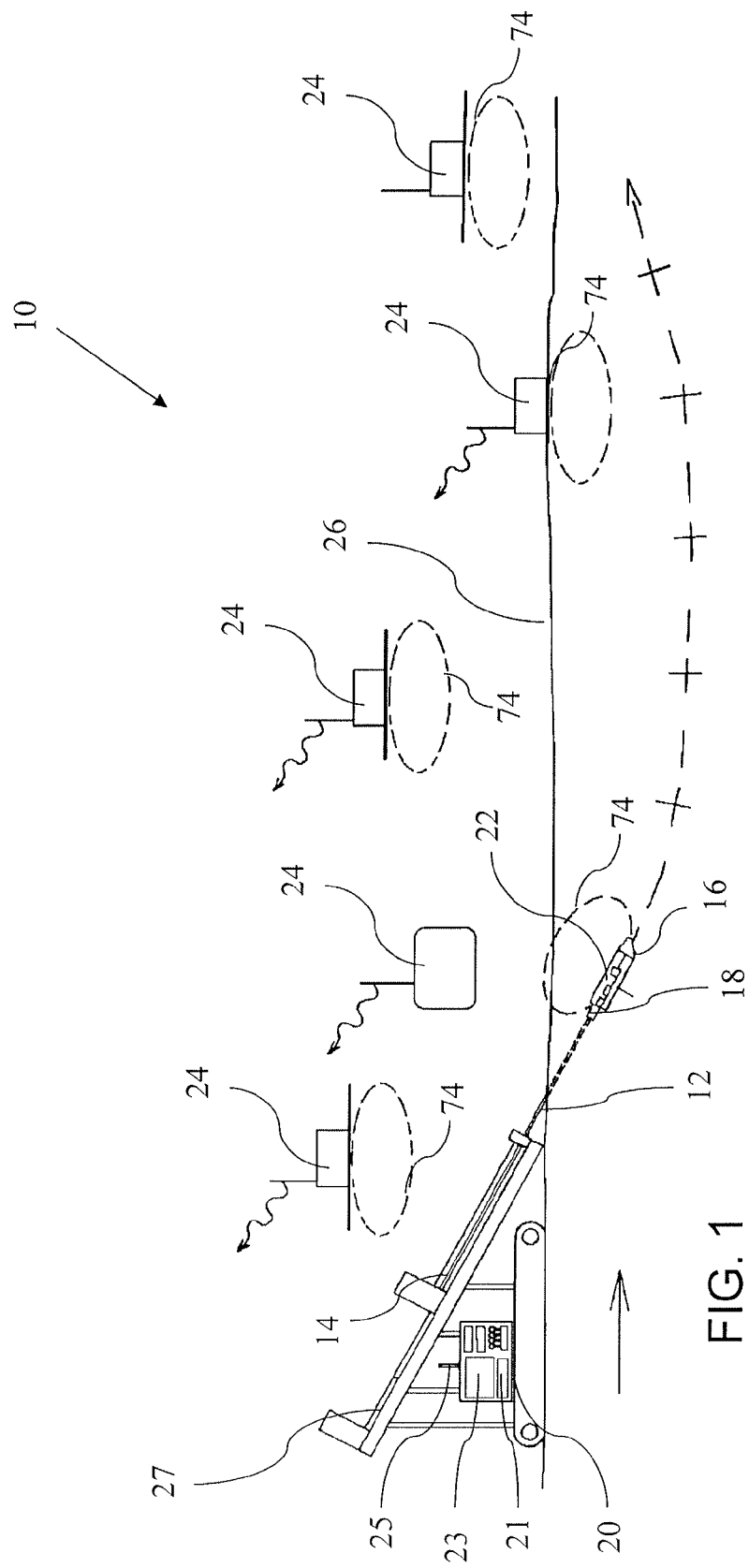
FIG. 1 is a side elevation view of a directional drilling system.
Figure 2:
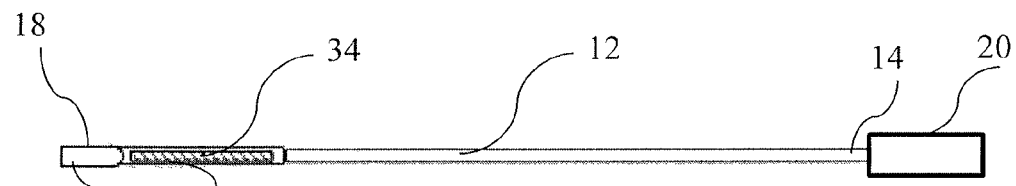
FIGS. 2 and 3 are side elevation views of drill strings.

Referring to FIG. 1, there is shown an apparatus for directional drilling system, generally identified by reference numeral 10. Referring to FIG. 2, apparatus 10 has a drill string 12 with a control end 14 and a drill bit end 18. Drill string 12 will not necessarily be a fixed length, and control end 14 may not be at a fixed position, or at a fixed distance, from drill bit end 18. Instead, drill string 12 will generally be lengthened as the drilling progresses and the borehole increases in length and/or depth. Control end 14 may be defined as the point at which a drilling control unit 20 engages drill string 12, and this point will change as drill string 12 is lengthened, which is generally done by adding sections of drill pipe to drill string 12. A generic type of drilling control unit 20 is shown in FIG. 1. This type of drilling control unit 20 is commonly used in directional drilling for creating boreholes under roadways, waterways, or other obstructions to run utilities. Drilling control unit 20 has control equipment that includes a processing unit 21, a display 23 a communication device 25 such as an antenna as shown or a data communication port. Display 23 may be a touch screen or there may be another input device used. It will be understood that the presently described method and apparatus may be used with other types of directional drilling and other control units, such as a drive head used in drilling hydrocarbon wells or other types of wells and boreholes. In each case, the operation of drill string 12 will be controlled by a device or tool that will engage drill string 12 in a manner sufficient to drive drill string 12, and this may be considered drilling control unit 20. As shown, there is a movable carriage 27 that engages drill string 12. Carriage 27 moves forward as drill string 12 advances into the borehole, and is retracted in order to accommodate a further section of drill string 12. Drilling control unit 20 may be controlled in other ways aside from those depicted. It will be understood that the details described herein apply to other types of directional drilling and control units beyond the examples shown in the drawings.

Figure 3:
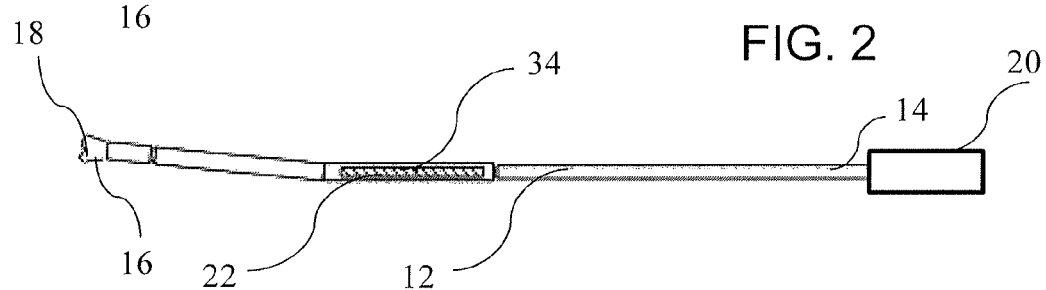

Referring to FIGS. 2 and 3, drill string 12 has a drill bit 16 carried at drill bit end 18. Drill string 12 may be any suitable type of directional drilling tool, such as a rotary bit-type drill string as shown in FIG. 2, or a mud motor-type drill string as shown in FIG. 3. Drill string 12 may be steered using any suitable type of directional drilling technique, such as a bent housing, adjustable bent housing, etc. Drill bit 16 may be any suitable type of drill bit used for directional drilling and will depend on the directional drilling strategy used. As shown, drill string 12 may include a downhole locating system 34 in a conventional sonde housing, or within the housing of transmitter 22 as shown. Downhole locating system 34 may be used to collect data regarding the position and direction of drill string 12 as well as information about the underground formation.

Referring to FIG. 1, drill string 12 carries a mechanical wave transmitter 22, which is carried adjacent to drill bit end 18. Transmitter 22 generates mechanical waves, or acoustic signals, that are received by receivers 24 positioned at a ground surface 26, above the formation through which drill string 12 is drilling. The propagation of mechanical waves through various underground formations has been well characterized and will not be described further herein. Acoustic waves of up to 1000 Hz are preferred, as lower frequencies propagate more efficiently through underground formations.

In addition to drill string 12, apparatus 10 includes an array of mechanical wave receivers 24 spaced from drill string 12 and in an array at a ground surface 26. Mechanical wave receivers 24 are designed to receive a mechanical wave signal that is transmitted by mechanical wave transmitter 22. This allows information to be passed from transmitter 22, which is positioned down hole with drill string 12, to receivers 24 at the surface. It will be understood that receivers 24 may not be directly on ground surface 26, but may be positioned above, or buried within, ground surface 26. Receivers 24 are generally in sufficient contact with ground surface to detect the mechanical waves, but may be positioned in order to be at, for example, a desired elevation if this is important to the method. As noted, transmitter 22 is used to transmit information to the plurality of receivers 24. This information is then processed by a processor in order to calculate the position of drill bit 16, such as the depth, longitudinal position, distance from control unit 20, etc. The information may be processed by one of processor 21 on drilling control unit 20, processor 48 on receiver 24 or processor 28 on main station 32 as will be described herein. The information may also be used to calculate the orientation of drill bit 16, such as the pitch and the rotational, or clockface, position of drill bit 16. Transmitter 22 may also be used to transmit other information related to other conditions, such as temperature, pressure, conditions related to drill bit 16 or drill string 12.

The information may be transmitted in various ways. In different examples, the mechanical wave may be a modulated acoustic signal. The acoustic signal may be frequency or amplitude modulated, or the information may be encoded in the duration, spacing or pattern of pulses. Other modulation or encoded using other techniques known in the art.

In one example, transmitter 22 may be designed to transmit at a particular frequency and may also be designed to transmit at a particular amplitude. Receiver 24 may be designed to look for mechanical waves at a particular frequency, or in a particular range, and in a particular amplitude range. This may be done, for example, to obtain additional information about the formation through which drill string 12 passes or to make it easier to distinguish the transmitted signal from any background or other signals. As there will be background noise, techniques may be used to improve the reliability of the signal.

In the event that transmitter 22 transmits a modulated signal, receiver 24 preferably comprises a demodulator component. Alternatively, the signal may be detected and transmitted to a separate processor, which may then demodulate or decode the signal.

In another example, transmitter 22 and receiver 24 may each be transceivers that can both transmit and receive a mechanical wave signal. This allows for communication in both directions between the units on surface, such as receivers 24, and drill bit 16. For example, receiver 24 may transmit a control signal to transmitter 22, such as a request for information, instructions or other information to transmitter 22. Transmitter 22 may then respond with the requested information or an acknowledgement. When receiving a signal, transceivers 22 and 24 may digitally sample the signal, or may process the signal using analog approaches.

Figure 5:
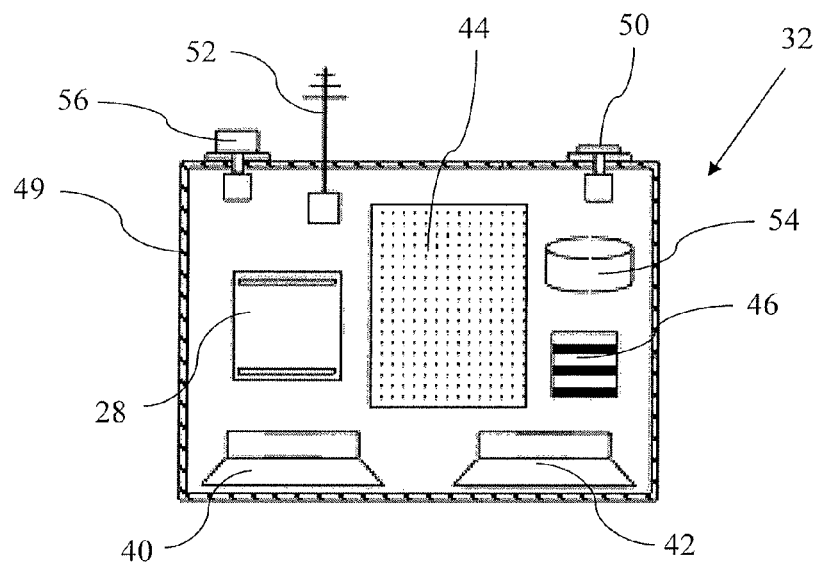
FIG. 5 is a block diagram of a main station.

In the example shown in FIGS. 7 and 8, receivers 24 are spaced above drill string 12 and remotely from drilling control unit 20. As can be seen, receivers 24 may be placed on either side of obstacle 30, or alternatively, may be placed in any suitable location. Obstacle 30 may be an above ground obstruction such as a roadway, waterbody, building or other structure or natural feature. The arrangement depicted includes one receiver that is a main station 32. Main station 32 is designed to act both as a receiver with respect to transmitter 22. Main station 32 also gathers information from other receivers 24 and communicates with a drilling control unit 20. Referring to FIG. 5, main station 32 preferably has a processor 28 to process and analyse the information. As will be recognized, the processing functions may be centrally located at a receiver 24 designated as a main station, or may be fully or partially distributed among the various receivers. Alternatively, the processing capabilities as well as the main station aspects may be incorporated into drilling control unit 20. The ultimate design will depend on the preferences of the user as well as the system that the apparatus is combined with, which may have legacy requirements or limitations. In one example, drilling control unit 20 may receive information regarding the underground formation solely from signals received through receivers 24. Information may also be received through other known means.

Processor 21 or 28 may perform various functions. In addition to receiving and compiling signals from transmitter 22 and receivers 24, processor 21 or 28 may be programmed to analyse the signals to interpret the position and direction of travel of drill bit 16. This may be done by using triangulation calculations and comparing to historical data. In some examples, it may also be programmed to characterize the underground formation, such as to interpret the type of material to be drilled, and the presence of any possible obstacles, such as other utility lines, pipelines, or natural obstacles. The algorithms used in these types of analyses are known in the art.

Figure 4:
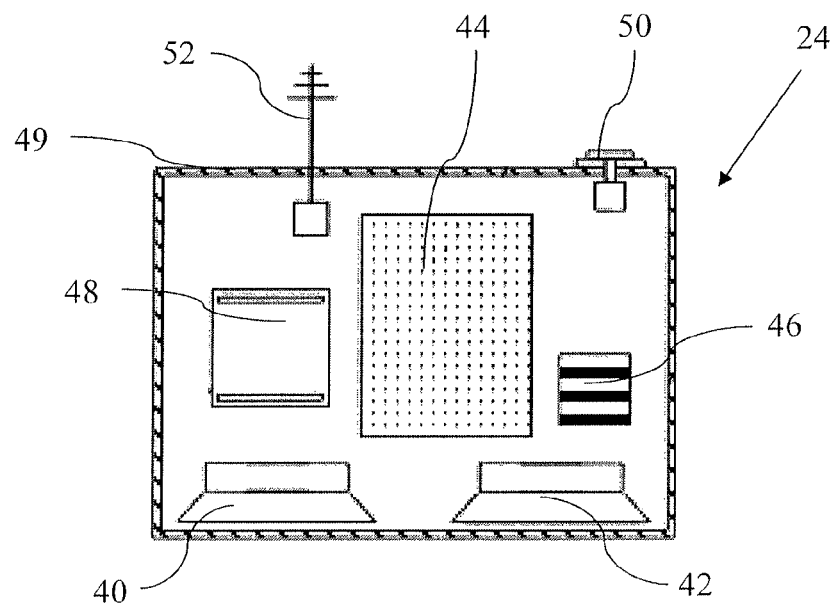
FIG. 4 is a block diagram of a receiver.

Referring now to FIG. 4, an example of a receiver 24 with both transmit and receive capabilities is shown in a block diagram. In the depicted example, receiver 24 has a sound generator 40, a sound receiver 42, a battery 44, a power management device 46, and a central processing unit 48 within a housing 49. The actual construction of sound generator and receiver 40 and 42 will not be described herein as there are commercially available products that may be used and the design of these devices is well known. Power management device 46 may be used to extend the useful life of battery 44 and may be used to control the operation of CPU 48 between "wake" and "sleep" modes. In addition, receiver 24 is also shown as having a GPS antenna 50 and an electrical-based communication device 52, such as an antenna as shown. This permits communication with equipment other than by using sound generator and receiver 40 and 42. CPU 48 may be programmed with the desired communication protocols in order to modulate signals transmitted by sound generator 40 or demodulate signals received by sound receiver 42 as well as with other instructions necessary to, for example, transmit and receive information, communicate with other equipment before, after or during drilling, or receive and process information from other sources. The actual components and arrangement of the components will depend on the preferences of the user and the constraints of the particular system. There may also be other data ports or sensors included with receiver 24, as well as other input/output hardware that are not shown, such as a screen or touch screen, a built-in keyboard, Bluetooth antenna, USB port, speaker, etc. that allow the device to be more user friendly and compatible with other equipment. Transmitter 22 and receiver 24 are preferably programmed to operate using known communication protocols, which are well known in the art and will not be described further.

Referring now to FIG. 5, an example of a main station 32 is shown. Main station 32 is preferably similar to receiver 24, but may have some additional hardware, such as a data storage device 54, which permits storage of more information, and a cellular transmitter 56, which permits communication with offsite equipment using, for example, a SCADA system. While the depicted receiver 24 in FIG. 4 is particularly designed to be a main station 32, other receivers 24 may or may not have all the same components shown in FIG. 5. For example, each receiver 24 may have all the necessary hardware and designating one receiver to act as a main station 32 may be merely a network designation. Preferably, receiver 24 and main station 32 are set up to establish a self-characterizing network. As each receiver 24 and main station 32 has a GPS antenna, 50, the location will be known and can be used to characterize the network without having to precisely position each device in a known location. Furthermore, each receiver 24 may be designed to act as a relay, such that a short-file communicator may be sufficient for each device, even if some receivers 24 are out of range for direct communication with a main station 32. Each receiver 24 and main station 32 may be designed to encrypt the data being transmitted.

Figure 6:
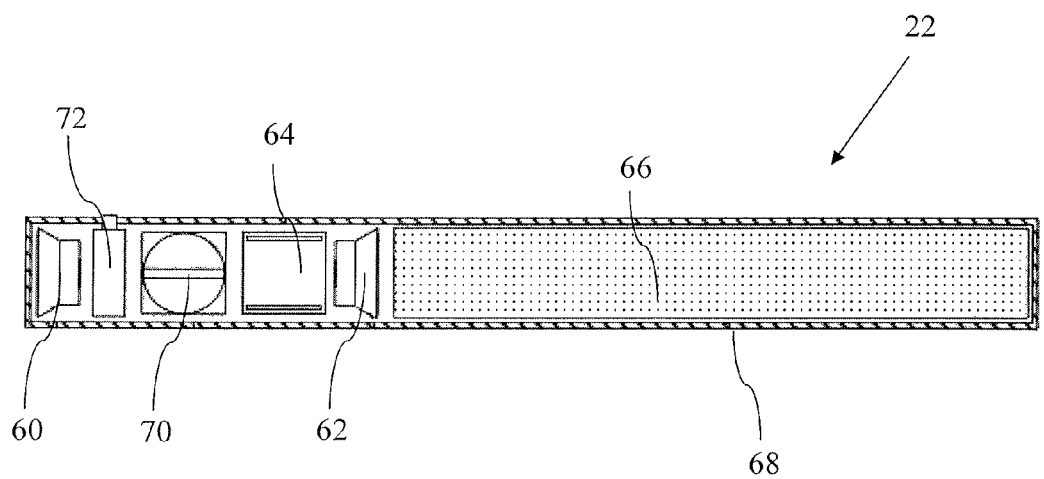
FIG. 6 is a block diagram of a transmitter.

Referring to FIG. 6, an example of a transmitter 22 is shown. As depicted, transmitter 22 includes a sound generator 60, a sound receiver 62, a CPU 64 and a battery 66 within a housing 68. These perform similar functions to those described with respect to receiver 24 described above.

In addition, transmitter 22 may also have other sensors such as a gyroscope and inclinometer 70 and a pressure and temperature sensor 72. These sensors may be individual or combined as shown, and may be replaced or supplemented by other known types of sensors that may be useful in a downhole environment.

In one example, apparatus 10 may be designed to permit automated drilling that would not require an operator to control the operation of drill string 12. Instead, a desired path may be programmed into drilling control unit 20, which would then be followed based on feedback and information received from transmitter 22 and receivers 24.

Referring now to FIGS. 7 and 8, a method of using system 10 in directional drilling will now be described. In one example, the method permits the position of a drill head to be located in Cartesian space through the triangulation of mechanical wave generated signals received by an array of receivers and processed by one or more processors. As the signals are not electromagnetic, they are not subjected to electromagnetic interference like other systems. Receivers 24 are preferably designed to discern low frequency mechanical signals, or other frequency ranges that are found to propagate efficiently through a formation. In doing so, the method may be used to track deep installation.

Drilling control unit 20 is position at a desired location adjacent to an entry point for the intended borehole while receivers 24 are distributed in an array at the surface along and spaced from the intended path of drill string 12 in such a manner that different readings will be received by each receiver 24. In one example, receivers 24 are able to establish a network by determining the location of other receivers, either by triangulation, or using GPS locators 50 and transmitting the location data to others, which makes the setup relatively easy as few measurements are required, aside from, for example, ensuring receivers 24 are in the vicinity of the intended drill path of drill string 12 and are sufficiently distributed to provide meaningful readings. In other embodiments, receivers 24 may also be located at a predetermined or specified position and elevation.

Drill string 12 is assembled as described above and is connected to drilling control unit 20. The drilling operation is then initiated. The details of the drilling operation are well known in the art, including the control and steering of drilling control unit 20, and will not be described further herein.

As drill string 12 moves through the underground formation, transmitter 22 that is carried at or toward the drill bit end 18 generates acoustic signals (labelled in FIG. 1 as signals 74) that propagate through the underground formation and are received by receivers 24. Based on these signals, receivers 24 calculate a position or location of drill bit 16, including its lateral position and depth. This is preferably done using triangulation by detecting the difference in time and possibly signal strength between the various receivers 24. In addition, other information may be communicated by transmitter 22 to one or more receivers 24, such as readings from downhole sensors that are indicative of downhole conditions, or conditions related to drill bit 16, drill string 12, etc., such as inclination, rotational position, etc. As described above, this information may be communicated in a variety of ways. In addition, the signals received by receivers 24 may be analysed to further characterize the formation through which drill string 12 is passing. This may be done by knowing the initial amplitude and frequency of the initial signal, looking for reflected waves, or may be determined by transmitter 22, which may detect its own signals reflected from the formation. As noted above, transmitter 22 and receivers 24 may be equipped to act as transceivers to allow for bi-directional communications. One or more receivers 24 may be used to communicate control signals to transmitter 22, such as a request for information or instructions. Transmitter 22 can then respond with the requested information or an acknowledgement of the instructions. Information transmitted may include information from sensors or that permit calculation of the inclination of drill bit 16, the rotational orientation of drill bit 16, the temperature of drill bit 16 and the formation pressure. The information and/or signals collected by receivers 24 are transmitted to a main station 32 and then to the necessary decision maker, whether it is a computer processor or an operator at drilling control unit 20. The information may also be communicated to other third parties or third party computers for other purposes. This information may be further processed and analysed for other information, such as information on the downhole conditions that may affect the drilling operation or that may be useful in otherwise characterizing the formation or evaluating the performance of drill string 12.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of directional drilling using mechanical wave detectors, the method comprising the steps of:
   providing a drill string having a drill bit at a drill bit end of the drill string;
   during an underground drilling operation in an underground formation, transmitting a mechanical wave signal using a mechanical wave transmitter carried at the drill bit end of the drill string;
   receiving the mechanical wave signal by an array of mechanical wave receivers at a ground surface above the underground formation;
   processing the received mechanical wave signals to determine at least a location of the drill bit in the underground formation; and
   communicating the position and direction of travel data to a drilling control unit;
   wherein the mechanical wave transmitter comprises a drill bit mechanical wave transceiver, and at least on mechanical wave receiver comprises a surface mechanical wave transceiver, and further comprising the step of transmitting instructions by modulating a control signal from the at least one surface mechanical wave transceiver, and transmitting the modulated control signal through the ground surface, to the drill bit mechanical wave transceiver.

2. The method of claim 1, wherein transmitting the mechanical wave signal further comprises modulating the mechanical wave signal and receiving the mechanical wave signal comprises demodulating the mechanical wave signal.

3. The method of claim 2, wherein the drill string further comprises downhole condition sensors connected to the mechanical wave transmitter, the mechanical wave transmitter modulating the mechanical wave signal to transmit readings from the downhole condition sensors.

4. The method of claim 3, wherein the downhole condition sensors comprise at least one of formation conditions, drill bit temperature, drill bit inclination and drill bit axial orientation.

5. The method of claim 1, wherein the drill bit mechanical wave transceiver is programmed to transmit a response to the instructions received from the at least one surface mechanical wave transceiver.

6. The method of claim 1, wherein the array of mechanical wave receivers are positioned remotely from the drill string and the drilling control unit.

7. The method of claim 1, wherein each mechanical wave receiver comprises a processor for processing the received mechanical wave signals.

8. The method of claim 1, wherein the drilling control unit receives underground information solely from the array of mechanical wave receivers.

9. The method of claim 1, wherein the received mechanical wave signals are processed to determine the direction of travel of the drill bit.

10. The method of claim 1, wherein the received mechanical wave signals include information regarding at least one of the inclination of the drill bit, the rotational orientation of the drill bit, the temperature of the drill bit, the temperature of the formation and the formation pressure.

11. The method of claim 1, wherein the received mechanical wave signals are processed to detect underground obstacles.

12. The method of claim 1, wherein the received mechanical wave signals are processed to characterize the underground formation.

13. The method of claim 1, wherein the drilling control unit controls the drill string.

14. The method of claim 1, wherein the transmitter and receiver are tuned to a predetermined frequency.

15. The method of claim 1, wherein the transmitter transmits the mechanical wave signals at a predetermined amplitude.

16. An apparatus for directional drilling system, the apparatus comprising:
   a drill string comprising a control end and a drill bit at a drill bit end, and the drill string further comprising a mechanical wave transmitter adjacent to the drill bit end of the drill string;
   an array of mechanical wave receivers spaced in an array at a ground surface, the mechanical wave receivers receiving a mechanical wave signal transmitted by the mechanical wave transmitter;
   a processor programmed to calculate at least a position of the drill bit based on the mechanical wave signal received by the plurality of mechanical wave receivers; and
   a drilling control unit at the control end of the drill string and connected to the processor, and the drilling control unit controlling the operation of the drill string in response to signals received from the processor;
   wherein the mechanical wave transmitter comprises a drill bit mechanical wave transceiver and at least one mechanical wave receiver comprises a surface mechanical wave transceiver, the at least one surface mechanical wave transceiver being adapted to transmit instructions by modulating a control signal that is transmitted from the at least one surface mechanical wave transceiver to the drill bit mechanical wave transceiver through the ground surface.

17. The apparatus of claim 16, wherein the mechanical wave transmitter signal comprises a mechanical wave modulator for modulating the mechanical wave signal and the mechanical wave receiver comprises a mechanical wave demodulator for demodulating the mechanical wave signal.

18. The apparatus of claim 17, wherein the drill string further comprises downhole condition sensors connected to the mechanical wave transmitter, the mechanical wave transmitter modulating the mechanical wave signal to transmit readings from the downhole condition sensors.

19. The apparatus of claim 16, wherein the drill bit mechanical wave transceiver is programmed to transmit a response to the instructions.

20. The apparatus of claim 16, wherein the one or more mechanical wave receivers are positioned remotely from the drill string and the drilling control unit.

21. The apparatus of claim 16, wherein each mechanical wave receiver comprises a processor for processing the received mechanical wave signals.

22. The apparatus of claim 16, wherein the drilling control unit receives underground information solely from the array of mechanical wave receivers.

23. The apparatus of claim 16, wherein the received mechanical wave signals are processed to determine the direction of travel of the drill bit.

24. The apparatus of claim 16, wherein the received mechanical wave signals are processed to detect underground obstacles.

25. The apparatus of claim 16, wherein the received mechanical wave signals include information regarding at least one of the inclination of the drill bit, the rotational orientation of the drill bit, the temperature of the drill bit, the temperature of the formation and the formation pressure.

26. The apparatus of claim 16, wherein the received mechanical wave signals are processed to characterize the underground formation.

27. The apparatus of claim 16, wherein the transmitter and receiver are tuned to a predetermined frequency.

28. The apparatus of claim 16, wherein the transmitter transmits the mechanical wave signals at a predetermined amplitude.

* * * * *